United States Patent [19]
Leach et al.

[11] Patent Number: 5,906,193
[45] Date of Patent: May 25, 1999

[54] RETROFIT TABLE ACCESSORY FOR BARBECUE GRILL

[75] Inventors: Frank D. Leach; Charles E. DeMeyer, both of Spring Green, Wis.

[73] Assignee: Greenbriar Products, Inc., Spring Green, Wis.

[21] Appl. No.: 08/868,082

[22] Filed: Jun. 3, 1997

[51] Int. Cl.[6] .................................................. A47J 37/00
[52] U.S. Cl. ...................... 126/25 R; 126/41 R; 126/40; 126/50
[58] Field of Search ................... 126/25 R, 41 R, 126/40, 50

[56] References Cited

U.S. PATENT DOCUMENTS

| | | |
|---|---|---|
| 1,625,412 | 4/1927 | French . |
| 1,708,424 | 4/1929 | McLeskey . |
| 2,101,686 | 12/1937 | Offutt . |
| 2,768,042 | 10/1956 | Persinger et al. . |
| 2,886,386 | 5/1959 | Spitzer . |
| 4,331,123 | 5/1982 | Alles et al. ............................. 126/9 R |
| 4,337,751 | 7/1982 | Sampson et al. ..................... 126/25 R |
| 4,688,541 | 8/1987 | Stephen et al. ....................... 126/25 R |
| 5,016,607 | 5/1991 | Doolittle et al. ..................... 126/25 R |
| 5,033,448 | 7/1991 | Sandweg ............................... 126/25 R |

*Primary Examiner*—Larry Jones
*Attorney, Agent, or Firm*—Teresa J. Welch; Stroud, Stroud, Willink, Thompson & Howard

[57] ABSTRACT

The invention provides a table accessory to an outdoor grill accessory, which is a pair of opposed work surfaces in the form of side tables. The accessory is easily retrofitted to the fire bowl of a conventional kettle type grill. In an illustrated embodiment, novel clips hook into the rim slot of the bowl to advantageously prevent air leaks. One or both of the side tables can be folded down when not in use. The accessory, when installed on the grill, does not impede the portability of the grill.

11 Claims, 3 Drawing Sheets

RETROFIT TABLE ACCESSORY FOR BARBECUE GRILL

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

This invention relates generally to barbecue grill accessories and in particular, to an accessory work surface or table.

Barbecue grills for outdoor cooking have become enormously popular in recent decades, especially the kettle type grills which have a fire bowl for containing the hot coals and a metal grid spaced above the coals for supporting food that is being cooked. A particularly popular kettle type grill is one in which the fire bowl is generally hemispherical with an circular open top and the metal grid is spaced below the upper edge or rim of the bowl. The bowl is supported in some models by a tripod leg arrangement, two legs of which have wheels rotatably mounted on an axle extending between the two legs and with rods connecting the two wheeled legs to the third leg. The end of the third leg rests on the ground to hold the grill in place. Some brands of kettle grills have the bowl supported by methods other than a tripod with wheels, for example, a four leg support. The grill typically has a removable cover, often also having a hemispheric shape.

Most barbecue grills, however, generally do not have any table surface for supporting items such as food, plates, utensils and the like. Some prior devices have attempted to respond to this problem. For example, U.S. Pat. No. 4,688,541 issued to Stephen et al. discloses a serving board which is configured to rest on a L-shaped frame in which one leg of the L is attached by clips to the fire bowl of a kettle type grill while the other leg rests on the ground and acts as a support for the serving board. As the table is supported by the ground, it must be set up each time the grill is moved. Further, if the grill or table should be accidentally bumped, the grill can be set in motion, and likely upsetting the table and things thereupon.

U.S. Pat. No. 4,337,751 issued to Sampson et al. discloses a similar arrangement except that the frame supporting the tray/table is a rod or strut that connects to one of the legs of the grill. One end of the tray/table is configured to be directly adjacent to the fire bowl and can become overheated during the cooking process. U.S. Pat. No. 4,331,123 issued to Alles et al. discloses a device similar in construction to that of U.S. Pat. No. 4,337,751 except that the tray/table is supported by one of the grill handles which is positioned near the top of the fire bowl. Again, the close fit of an end of the tray/table to the fire bowl can result in overheating during the cooking process.

Other table surfaces for grills are disclosed in, e.g., U.S. Pat. No. 2,886,386 issued to Spitzer and U.S. Pat. No. 2,768,042 issued to Persinger. et al. The construction of these devices is similar to those of the above-described patents with either a strut support to a leg of the grill or an L-shaped support with one leg of the L serving as a ground support for the table.

Thus, notwithstanding these known table surfaces, the art has not adequately responded to date with the introduction of a table or work area that requires neither a strut support nor a separate leg support, and that does impede the portability of the grill.

BRIEF SUMMARY OF THE INVENTION

The present invention provides a table accessory for a barbecue grill. The table accessory in accordance with the present invention provides two work surfaces to accommodate the many items needed to barbecue, all without detracting from the portability of the grill. The two table surfaces extend horizontally on opposite side of the fire bowl of the grill. The table does not require any strutting or a separate leg for support. The table in accordance with the present invention is conveniently assembled and can be retrofit to existing grills with no structural modification to the grill.

The foregoing, and other advantages of the present invention, are realized in one aspect thereof in a table accessory for a barbecue grill comprising an attachment for a barbecue grill of the type having a fire bowl with a rim and an understructure supporting the fire bowl. The understructure in one embodiment is a tripod of three legs. The accessory includes a pair of table surfaces, a support frame for the pair of table surfaces, and clips for attaching the support frame to the fire bowl. Each table surface includes one or more panels which serve as the surface.

The support frame includes a pair of substantially parallel and complementary frame members. Each frame member has a semicircular midportion and a pair of opposed straight end portions. The semicircular midportion of one frame member is complementary to the semicircular midportion of the other frame member, i.e., the two portions placed end to end and opposite each other would substantially complete a circle. The clips are attached to the midportions of the support frame members and to the rim of the fire bowl, and the straight end portions are disposed on opposite sides of the fire bowl. The table surfaces are also opposed to each other, i.e., one table surface is superposed and affixed to one pair of end portions of the support frame members, while the other table surface is superposed and affixed to the other pair of end portions.

The accessory further includes a fold-away mechanism for folding the table surfaces into a vertical, downward depending position. The fold-away mechanism includes two three-piece support frames, each of which includes a midportion member, and a pair of end members for affixing to each end of the midportion member. Each end of the midportion member has two spaced apart bolt heads protruding from a side surface of the midportion member. Each end member has opposed ends, one end of which has an end slot configured and dimensioned to receive one of the bolt heads of the midportion member and an opening spaced apart from the end slot configured and dimensioned for receiving the other bolt head of the midportion member. The opening has an elongate portion and a substantially circular portion. The elongate portion receives a bolt head when the table surface is in a horizontal position and the substantially circular portion receives the bolt head when the table surface is in a downwardly depending, vertical position.

The accessory includes two varieties of clips depending on the construction of the rim of the fire bowl of the grill. In one embodiment, the clip comprises a straight midportion, a short bent end portion, and a longer perpendicular end portion, i.e., the perpendicular end portion is perpendicular to the straight midportion. The bent short end is suitably inserted into and hangs from the rim of the fire bowl. In the second embodiment, the clip includes a straight midportion, a hooked end portion, and a straight portion perpendicular to the midportion. The hooked end portion is hooked over the rim of the fire bowl, substantially abutting the upper inner portion of the fire bowl.

In a further aspect, the present invention is a kit containing the components described hereinabove of the table accessory, including the appropriate hardware for fastening the various components as described herein.

Other advantages and a fuller appreciation of the specific attributes of this invention will be gained upon an examination of the following drawings, detailed description of preferred embodiments, and appended claims. It is expressly understood that the drawings are for the purpose of illustration and description only, and are not intended as a definition of the limits of the invention.

BRIEF DESCRIPTION OF THE DRAWING(S)

The preferred exemplary embodiment of the present invention will hereinafter be described in conjunction with the appended drawing wherein like designations refer to like elements throughout and in which.

DETAILED DESCRIPTION OF THE INVENTION

The present invention relates to an outdoor grill accessory, which is more particularly an outdoor grill attachment having a pair of opposed work surfaces in the form of side tables. The present invention is characterized by an ability to retrofit a fire bowl of a conventional kettle-type grill with side tables which are positively secured to the grill without impeding the portability of the grill. In one embodiment, one or both of the side tables can be folded down when not in use. The retrofitting of a conventional kettle-type grill is easy and economical. The table accessory of the present invention solves the problem of where to put various items used in barbecuing, such as condiments and the like or food to be cooked. These attributes are achieved through a novel combination of physical features.

Figure 1:
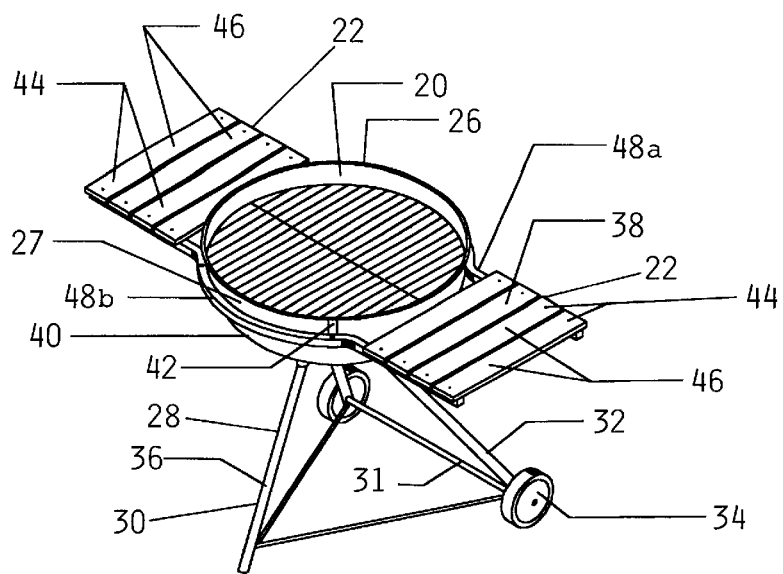
FIG. 1 is a perspective view of a conventional barbecue grill retrofit with the accessory in accordance with the present invention.
Figure 3:
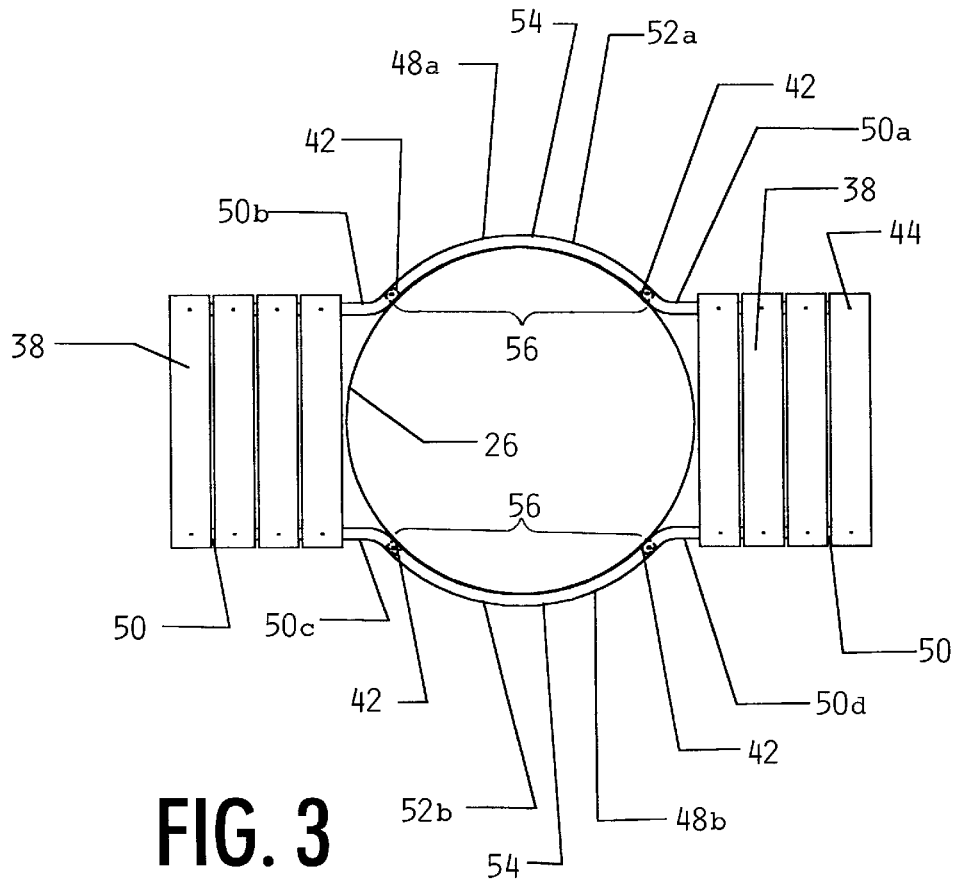
FIG. 3 is a top view of the accessory in accordance with the present invention.
Figure 2:
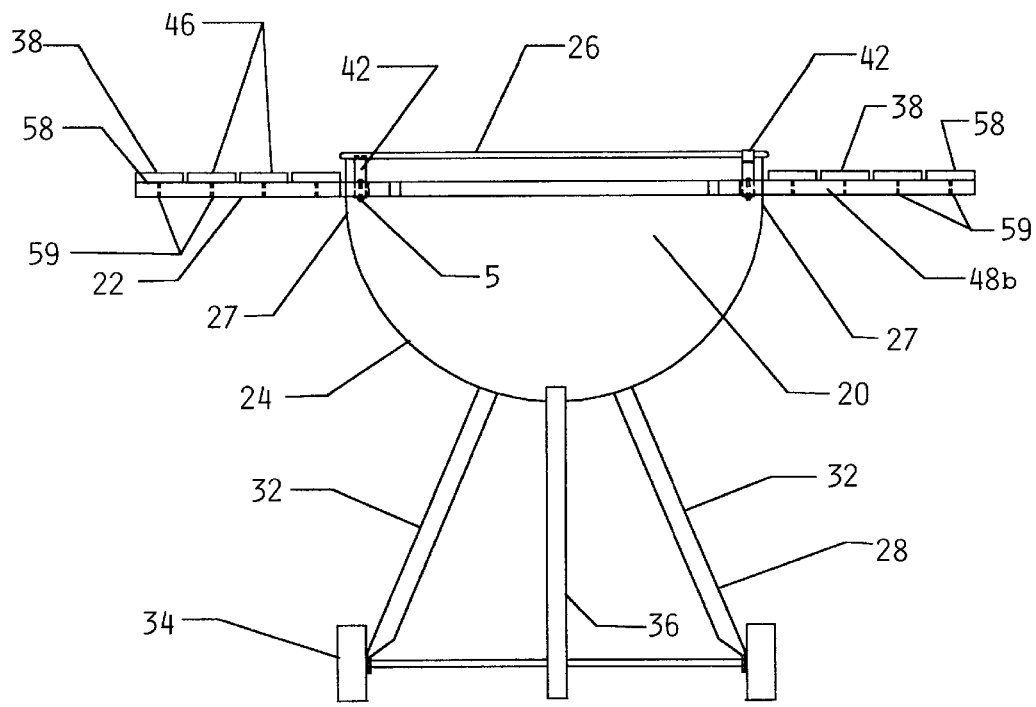
FIG. 2 is a side view of the retrofitted grill of FIG. 1.
Figures 4, 5:
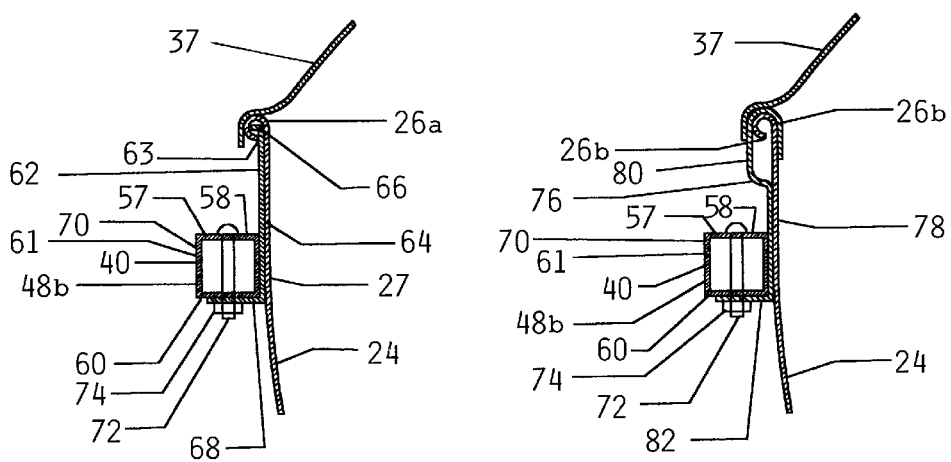
FIG. 4 is a cross sectional side view of a first embodiment of the clip attachment mechanism of the accessory to the top rim of the barbecue grill.
FIG. 5 is a cross section side view of a second embodiment of the clip attachment mechanism of the accessory to the top rim of the barbecue grill.

Reference is initially made to FIGS. 1 and 3 depicting a conventional barbecue grill, generally designated as reference numeral 20, and having a table accessory 22 in accordance with the present invention mounted thereon. Grill 20 includes a generally hemispheric fire bowl 24 having an outwardly rolled rim or lip 26, and an understructure 28 for supporting fire bowl 24. Fire bowl 24 has an upper circular portion 27 which is just below rim 26. In the illustrated embodiment, understructure 28 includes a tripod leg arrangement 30 in which two legs 32 each have a wheel 34 proximate the end of the leg and rotatably mounted on an axle 31 extending between the two legs 32; a third leg 36 is without a wheel. Grill 20 further includes a generally hemispheric-shaped cover 37, a portion of which is shown in FIGS. 4 and 5.

The table accessory 22 in accordance with the present invention includes a pair of table surfaces or side tables 38, a table support frame 40, two pairs of clips 42 for attaching support frame 40 to rim 26 of fire bowl 24, and fasteners, e.g., bolts or screws 44, for attaching tables surfaces 38 to support frame 40.

Side tables 38 are cantilevered out on opposite sides of the upper portion 27 of fire bowl 24, i.e., extending in opposite direction from the sides of the fire bowl. Side tables 38 are suitably constructed of one or more panels 46. In the illustrated embodiment, each side table 38 is conveniently made of a plurality of panels 46 which are fit in parallel, side by side relation to each other to form table surface 38. The number of panels is suitably four, although other numbers of panels 46 may be used. Panels 46 are suitably made of wood or a wood-based product such as particle board, although other materials suitable for making a table or horizontal surface area are also contemplated.

Support frame 40 includes two generally parallel and complementary tubular members 48a and 48b, respectively. Each member 48 has a pair of opposed straight end portions 50a and 50b, and 50c and 50d, respectively, and a semicircular midportion 52a and 52b, respectively. Each midportion 52 has a curvature 54 which is registration with upper portion 27 of fire bowl 24, i.e., midportion 52 is superposed on upper portion 27, covering an arc 56 of circular upper portion 27. As best seen in FIGS. 4 and 5, each member 48 is suitably of hollow tubular construction with a square cross-section 57 having a top 58, a bottom 60 and sides 61.

Holes 59 for attaching panel 46 to Portion 50 are spaced along top 58 of portion 50. In the illustrated embodiment wherein four panels 46 are utilized to form surface 38, each portion 50 has four spaced apart holes 59 on top 58 which are spaced apart to accommodate the attachment of panels 46 to portion 50. Each panel 46 is attached to portions 50 by screwing bolt screw 44 or the like through panel 46 at the appropriate location and into hole 59 of portion 50.

As illustrated in FIGS. 4 and 5, clips 42 attach support frame 40 with tables 38 to rim 26 of fire bowl 24. Clips 42 are positioned approximately 45° apart around the bowl perimeter. FIG. 4 illustrates a first embodiment 62 of clip 42. Clip 62 is suitably used to attach support frame 40 to a rim 26a. Rim 26a is constructed as an outwardly rolled lip such that it substantially completes a closed circle with a slot 63 which can accept clip 62. Clip 62 includes a straight, i.e., rectilinear, portion 64, a bent end portion 66 and a right angle end portion 68, i.e., portion 68 is perpendicular to portion 64. Portion 68 supports a section 70 of midportion 52 of support frame 40. Section 70 is positioned so that it superposes end portion 68 and a bottom portion of portion 64. The bottom 60 of section 70 is placed on portion 68, and section 70 is attached to portion 68 suitably with a bolt 72 through top 58 and bottom 60 and portion 68, and extending from portion 68. A nut 74 is suitably threadedly attached to bolt 72, securing section 70 to portion 68. In use, short bent end portion 66 of clip 62 is inserted into slot 63 below circular rim 26a, rotated downward, with straight portion 64 resting on the upper outside portion 27 and the side of fire bowl 24. Clip 62 advantageously eliminates air leakage when cover 37 is placed on the grill as well as prevents one table from lifting upward if an unbalanced load is applied to the other table.

FIG. 5 illustrates a second embodiment 76 of clip 42 which accommodates another rim configuration 26b. Rim 26b is similar to rim 26a except that its rolled rim completes a circle and does not have an open slot underneath to accommodate preferred clip 62. Clip 76 includes a straight portion 78, a hook portion 80 on one end and a right angle end portion 82, i.e., portion 82 is perpendicular to portion 78. Similar to the operation of clip 62, portion 82 supports section 70 of midportion 52 of support frame 40, and is attached to support frame 40 suitably with a bolt and nut as described hereinabove for clip 62. In use, however, clip 76 is attached to fire bowl 24 by hooking hook portion 80 over rim 26b such that portion 80 is superposed on rim 26b and the inside upper portion of fire bowl 24, with straight portion 78 resting on upper outside portion 27.

Figure 8:
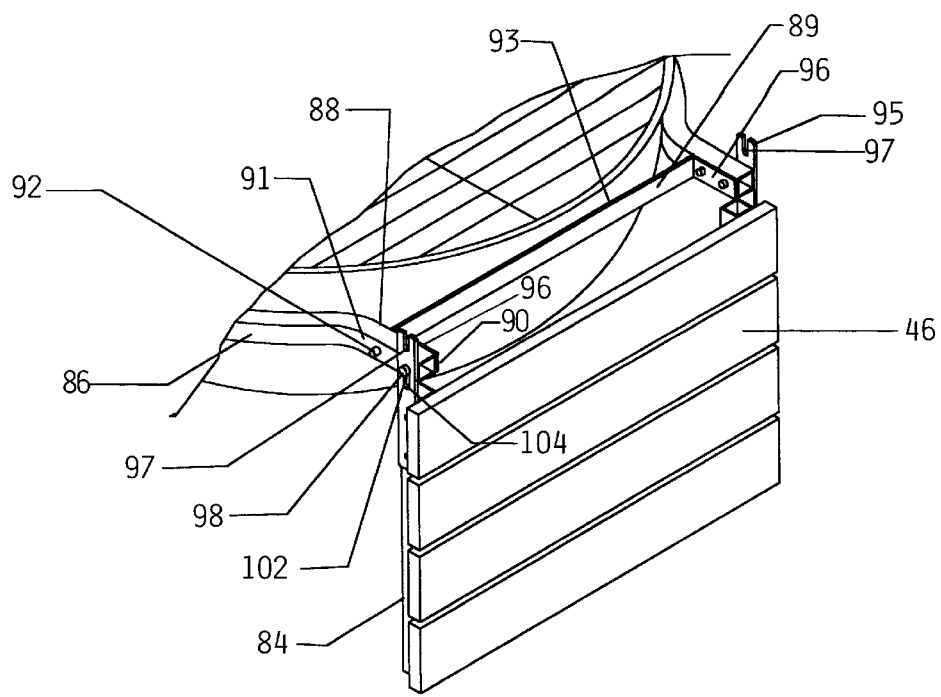
FIG. 8 is a partial perspective view of the fold-down mechanism with one of the table surfaces in the fold-down position.
Figure 6:
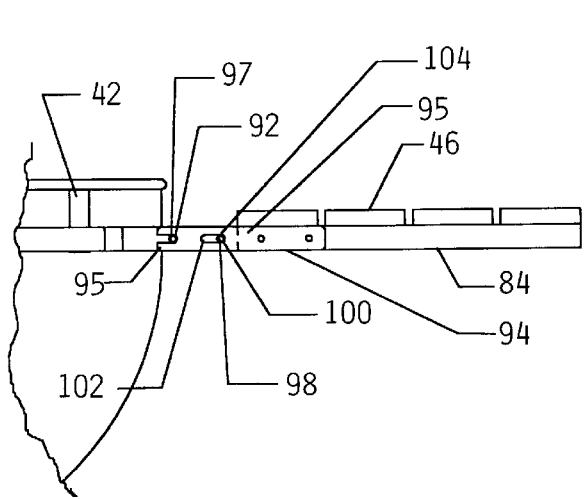
FIG. 6 is a partial side view of a grill as shown in FIG. 1 illustrating the fold-down feature of the accessory in accordance with the present invention in the horizontal locked position.
Figure 7:
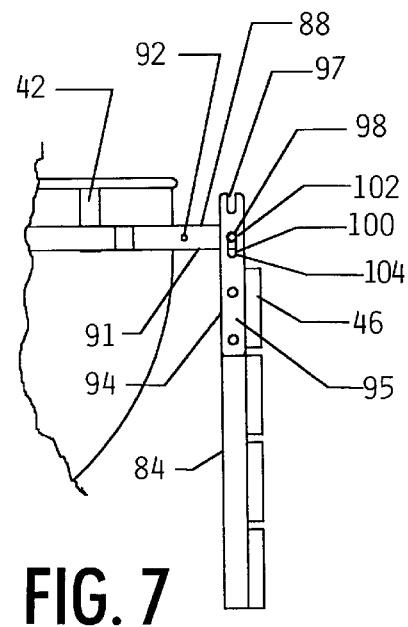
FIG. 7 is a partial side view of the fold-down mechanism with one of the table surfaces in the fold-down position.

As best seen in FIGS. 6–8, retrofit table 22 in accordance with the present invention is optionally constructed such that one or both side tables 38 can be folded away, i.e., folded so that they are in a vertical rather than horizontal position, for storage or when not in use. In this illustrated alternate design, end portions 50 of support frame 40 are separate end members 84 and midportion 52 is a substantially semicircular member 86 with opposed and straight end portions 88 having ends 90. Each end portion 88 has an outside side surface 91 with a collared bolt head 92 that is protruding from side surface 91 of end portion 88, and spaced apart from end 90 and a second collared bolt head 98 spaced between end 90 and head 92. A tie strap 89 is attached to each parallel end portion 88. Tie strap 89 is substantially U-shaped with an elongate middle portion 93 and a pair of opposed perpendicular end portions 96. End portions 96 are secured to end portions 88 suitably with collared bolts 92 and 98. Each end member 84 has an end 94 and a lock bar 95 suitably attached to end 94 and has a slot 97 at one end into which head 92 can be inserted. In use, slot 97 holds head 92 fast so that side table 38 is held in a horizontal position. End member 84 includes an elongate, substantially oval, slot opening 100 spaced apart from slot 97. Opening 100 has end portions 102 and 104. Slot 100 is positioned to substantially superpose head 98. In use, when side table 38 is in a horizontal position and head 92 is secured into slot 97, opening 100 is substantially superposed on head 98 such that head 98 occupies portion 104. For the fold-up position, slot 97 is slid out, i.e., retracted from, from head 92 in a telescoping manner and head 98 slides into portion 102. Side table 38 is then pivoted on head 98 and placed in a vertical position. It is understood that lock piece 95 may be suitably constructed as an integral end portion of end member 84 or with a bolting structure similar to that described for the attachment of section 70 to clip 44 hereinabove.

As table 22 is suitably a retrofit accessory to an existing grill 20, it is contemplated that the table is presented in a kit and assembled by a user onto grill 20. Such an exemplary kit for the fixed table embodiment contains a pair of table surfaces, typically one or more identical sized panels or slots, conveniently four in number; a pair of support frame members and clips, typically four in number, and appropriate fasteners, e.g., bolts and nuts. To assemble accessory table 22 in the illustrated embodiment wherein the table is fixed, bowl 24 has rim 26a and the short bent end each of 66 of four clips 62 is inserted into slot 63 below kettle rolled rim 26a and rotated downward to hang vertically. The tubular support frames 40 are then laid on the clip end portion 68 and the placement of the clips is adjusted so that the bolt holes in support frames 40 aligns with bolt holes of clips 62. Clips 62 are then attached to support frames suitably using ¼×1¼ inch bolts and nuts. To attach the table panels or slats 46, a first table slat is bolted to support frames on each side of the kettle bowl using the bolt holes closest to the bowl for the first slats. After this inner slat on each side of the bowl is attached using ⁵⁄₃₂×1¼ bolts and nuts, the remaining slats are attached in similar fashion.

An exemplary kit for the fold-away table embodiment contains a pair of semi-circular support members, two pairs of end support members, a pair of table surfaces suitably for slats, four clips, a pair of tie straps, and appropriate fasteners, e.g., bolts and nuts. To assemble the drop-leaf table embodiment, the slotted flat lock bars 95 are attached to each of the four straight tubular end 94 of members 84 with two bolts and nuts in each section with the slotted ends 97 projecting outward. Table slats 46 are then bolted to each pair of tubular sections as described hereinafter with the lock bars 95 to the outside of the tubular sections. The short bent end of each hanger clip 62 is inserted into slot 63 below the kettle rolled rim 26a and rotate downward to hang vertically. The semi-circular tubular support frame members 86 are laid on the clip end portions 68 and the placement of the clips is adjusted so that the bolt holes in the support frames align with bolt holes of the clip. The tie straps 89 are then bolted using two bolts between the tubular support frame end portions 88 to tighten the support frame about the bowl with the collared bolt head end toward the outside of the tubular frame and nuts to the inside. Each assembled table section is then attached to the tubular support frame using two bolts with collared heads to the outside, one of which is inserted through the inner slot 100 of the lock bar 95 and through the hole in the tubular support with the lock nut on the inside. After both tables are attached, the table surface can be pivoted upwards to the level position and pushed toward the bowl, engaging the slotted ends 97 of the lock bars 95 in the collar of the bolts holding the tie bars to the support frames.

In summary, the present invention provides a table accessory which can be retrofit to an existing barbecue or outdoor grill. The table is easy to assemble and provides work and table surfaces that are not typically available with the grill. The table accessory does not impede the portability of the grill. In one embodiment, the table accessory has a fold-down feature so that the tables can be folded away when not in use.

While the present invention has now been described and exemplified with some specificity, those skilled in the art will appreciate the various modifications, including variations, additions, and omissions, that may be made in what has been described. Accordingly, it is intended that these modifications also be encompassed by the present invention and that the scope of the present invention be limited solely by the broadest interpretation that lawfully can be accorded the appended claims.

We claim:

1. An accessory for a barbecue grill of the type having a hemispheric fire bowl with a rim and an understructure supporting the fire bowl, said accessory comprising:

a pair of table surfaces; a support frame for supporting said pair of table surfaces; and clips for attaching said support frame to the fire bowl;

each said table surface comprising a panel;

said support frame comprising a pair of substantially parallel and complementary frame members, each said frame member having a semicircular midportion, said midportion having a curvature in registration with the fire bowl and a pair of opposed straight end portions, said semicircular midportion of one frame member being complementary to the semicircular midportion of the other frame member; one of said table surfaces superposed and affixed to one end portion of each said frame member, and said other table surface superposed and affixed to the opposite end portion of each said frame member; said clips attaching said midportion of each said pair of support frame members to the rim of the fire bowl.

2. The accessory of claim 1, wherein said table surface is a plurality of panels in parallel relation, each of which is superposed and attached to an end portion of each said frame member.

3. The accessory of claim 1, further comprising a fold-away mechanism for folding said table surfaces into a vertical, downward depending position.

4. The accessory of claim 1, wherein said clip comprises a straight midportion having opposed ends, one said end being a bent end, and the other said end being a straight portion perpendicular to said midportion, said bent end for inserting into and hanging from the rim of the fire bowl.

5. The accessory of claim 1, wherein said clip comprises a straight midportion having opposed ends, one said end being a hooked portion, the other said end being a straight portion perpendicular to said midportion, said hooked portion for hooking over the rim of the fire bowl.

6. An accessory for a barbecue grill of the type having a fire bowl with a rim and an understructure supporting the fire bowl, said accessory comprising:

a pair of table surfaces; a support frame for supporting said pair of table surfaces; and clips for attaching said support frame to the fire bowl;

each said table surface comprising a panel;

said support frame comprising a pair of substantially parallel and complementary frame members, each said frame member having a semicircular midportion and a pair of opposed straight end portions, said semicircular midportion of one frame member being complementary to the semicircular midportion of the other frame member; one of said table surface superposed and affixed to one end portion of each said frame member, and said other table surface superposed and affixed to the opposite end portion of each said frame member; said clips attaching said midportion of each said pair of support frame members to the rim of the fire bowl; and a fold-away mechanism for folding said table surfaces into a vertical, downward depending position; wherein said fold-away mechanism comprises two three-piece support frames and a pair of tie straps for securing said support frames to the fire bowl, each support frame including a semicircular midportion member having said semicircular midportion and having a pair of opposed ends, and a pair of end members affixed to each end of said midportion member; said pair of end members corresponding to said pair of opposed straight end portions; each end of said midportion member having a side surface having two spaced apart collared bolt heads protruding therefrom; one said tie strap securing and holding together one set of ends of said midportion members, the other said tie strap securing and holding together the other ends of said midportion members, each said end member having opposed ends, one end having an end slot.

7. An accessory table kit for a barbecue grill of the type having a hemispheric fire bowl with a rim and an understructure supporting the fire bowl, said accessory comprising:

(a) a pair of table surfaces, each said pair comprising at least one panel;

(b) a support frame for supporting said pair of table surfaces and for attaching to the fire bowl, said support frame having a curvature in registration with the fire bowl; and (c) clips for attaching said support frame to the fire bowl, said clips disposed on said curvature of said support frame.

8. The kit of claim 7, wherein said support frame comprises a pair of substantially parallel and complementary frame members, each said frame member having a semicircular midportion and a pair of opposed straight end portions, said semicircular midportion of one frame member being complementary to the semicircular midportion of the other frame member; one of said table surface superposed and affixed to one end portion of each said frame member, and said other table surface superposed and affixed to the opposite end portion of each said frame member.

9. An accessory table kit for a barbecue grill of the type having a fire bowl with a rim and an understructure supporting the fire bowl, said accessory comprising:

(a) a pair of table surfaces, each said pair comprising at least one panel;

(b) a support frame for supporting said pair of table surfaces and for attaching to the fire bowl; and (c) clips for attaching said support frame to the fire bowl, wherein said support frame comprises a pair of substantially parallel and complementary frame members, each said frame member having a semicircular midportion and a pair of opposed straight end portions, said semicircular midportion of one frame member being complementary to the semicircular midportion of the other frame member; one of said table surface superposed and affixed to one end portion of each said frame member, and said other table surface superposed and affixed to the opposite end portion of each said frame member, and wherein each said frame member comprises a semicircular member having said semicircular midportion, a pair of separate straight end members, said pair of straight end members corresponding to said pair of opposed straight end portions, wherein said pair of straight end members, a pair of tie straps for securing said semicircular member of one frame member to said other frame member, each semicircular member having a pair of opposed ends, each end of each said semicircular member having a side surface having two spaced apart collared bolt heads protruding therefrom; each said end member having an end having a slot configured and dimensioned to receive one of said bolt heads of said midportion member and an opening spaced apart from said end slot, configured and dimensioned for receiving said other bolt head of said midportion member; said opening having an opposed end portions, one said end portion for receiving said other bolt head when said table surface is in a horizontal position and said other end portion for receiving said other bolt head when said table surface is in a downwardly depending, vertical position.

10. In combination a table accessory and a barbecue grill, the barbecue grill being of the type having a hemispheric fire bowl with a rim and an understructure supporting the fire bowl, said accessory comprising:

(a) a support frame having a pair of complementary semicircular midportions, having a curvature in registration with the fire bowl and substantially concentric with the upper portion of the fire bowl, and two pairs of parallel end portions, extending horizontally from opposite sides of the fire bowl;

(b) a pair of table surfaces, each said pair comprising at least one panel, and supported on a pair of parallel end portions of said support frame; and (c) two pairs of clips, each said pair attached to one of said midportions of said support frame and to the fire bowl.

11. The combination of claim 10, wherein said support frame comprises a pair of substantially parallel and complementary frame members, each said frame member having a semicircular midportion and a pair of opposed straight end portions, said semicircular midportion of one frame member being complementary to the semicircular midportion of the other frame member; one of said table surface superposed and affixed to an end portion of each said frame member, and said other table surface superposed and affixed to an opposite end portion of each said frame member.

* * * * *